Patented Apr. 21, 1931

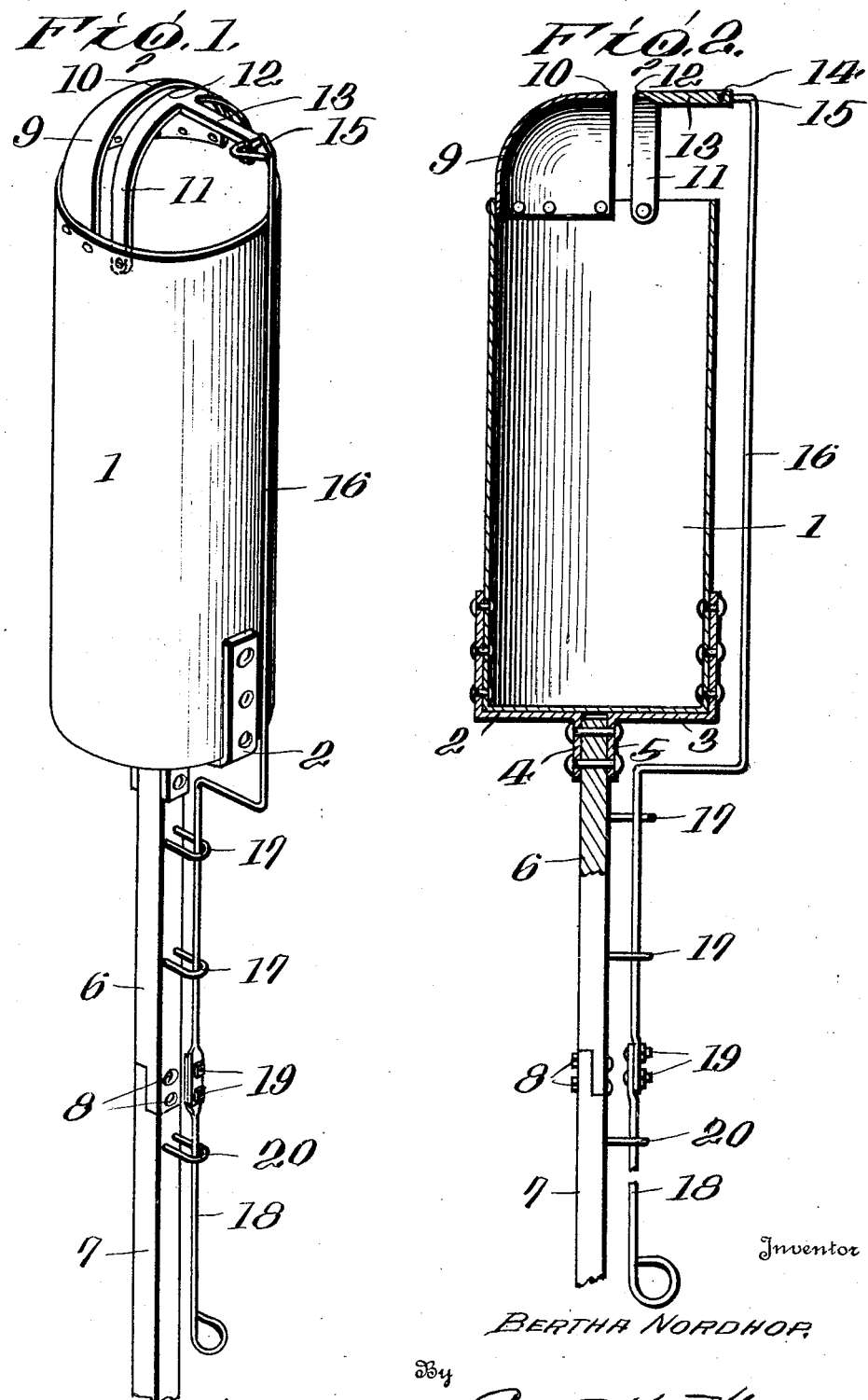

1,802,267

UNITED STATES PATENT OFFICE

BERTHA NORDHOP, OF ROCKFORD, ILLINOIS

FRUIT PICKER

Application filed February 20, 1928. Serial No. 255,737.

This invention relates to certain new and useful improvements in fruit pickers, the object being to provide a fruit picker which is exceedingly simple and cheap in construction and one in which the parts are so arranged that they are not likely to get out of order in operation.

Another object of my invention is to provide a fruit picker in which a receptacle is provided with a fixed hood forming a biting edge which is adapted to cooperate with a pivoted member so as to grasp the fruit and pull it from the tree.

A still further object of the invention is to provide a fruit picker with an extensible handle to enable handles of various lengths to be employed.

Other and further objects and advantages of the invention will be hereinafter set forth and the novel features thereof defined by the appended claim.

In the drawings:

Figure 1 is a perspective view of a fruit picker constructed in accordance with my invention; and Figure 2 is a vertical section through the same.

In carrying out my invention I employ a cylindrical receptacle 1 having an open top and a closed bottom to which are connected supports 2 and 3 which terminate in downwardly extending portions 4 and 5 between which is bolted a handle 6. The handle 6 is provided with a removable section 7 which is bolted to the section 6 by bolts 8, the two overlapping ends being cut away as shown to form a joint which will be rigid.

Secured to the upper edge of the receptacle 1 is a hood 9, the open edge of which is in substantially vertical alignment with the center of the receptacle in order to provide a biting edge 10. Pivotally mounted on the edge of the receptacle is a bail-shaped member 11 which is provided with a biting edge 12 adapted to cooperate with the biting edge 10 so as to grip the stem of the fruit between the biting edges when the bail member is swung on its pivot.

The bail member is provided with an extension 13 having an aperture 14 at its end through which loosely extends a triangular-shaped member 15 formed on the end of an operating rod 16, which has its lower end bent inwardly and downwardly and is loosely mounted in guide members 17 carried by the handle section 6. The operating rod 16 is provided with an extension 18 which is secured to the lower end of the rod by bolts 19, said extension being mounted in a guide 20 carried by the removable section 7 of the handle, the lower end preferably terminating in a loop as clearly shown to facilitate the operation of the same.

In the operation of a picker constructed in accordance with my invention, when the handle is drawn downwardly, the pivoted gripping member is swung away from the fixed gripping member so as to allow the same to be placed over the fruit to be picked and by forcing upwardly on the operating rod, the movable gripping member will be forced into engagement with the stem so that the stem of the fruit is gripped by the fixed and movable gripping members and by pulling downwardly on the receptacle, the fruit will be severed from the tree and drop into the receptacle.

What I claim is:

As a new article of manufacture, a fruit picker comprising a cylindrical shaped receptacle having a handle at its closed end for supporting the same with its open end in a vertical position, a hood-shaped member secured within and extending over the open end of said receptacle having a biting edge substantially in vertical alignment with the center of said receptacle, a pivoted bail mounted in the open end of said receptacle and extending upwardly therefrom having a biting edge in substantially the same plane as the biting edge of the hood-shaped member and adapted to cooperate therewith, said biting edges being normally held in spaced relation to one another, said bail being provided at its center with a horizontally disposed arm extending outwardly beyond the receptacle having an aperture formed in its end and a slidably mounted operating rod mounted on the handle and having an offset portion arranged parallel with the receptacle and terminating in a rectangular loop at its upper end pivotally mounted in the aperture of said arm for swinging said bail shaped member towards and away from said hood-shaped member as said rod is reciprocated.

In testimony whereof I hereunto affix my signature.

BERTHA NORDHOP.